United States Patent
Britt et al.

(10) Patent No.: US 8,331,921 B2
(45) Date of Patent: *Dec. 11, 2012

(54) MANAGING SUBSCRIBERS ON A CELLULAR NETWORK

(75) Inventors: Joe Freeman Britt, Los Gatos, CA (US); Jeffrey Bush, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/206,376

(22) Filed: Aug. 9, 2011

(65) Prior Publication Data

US 2011/0294487 A1  Dec. 1, 2011

Related U.S. Application Data

(63) Continuation of application No. 11/351,982, filed on Feb. 10, 2006, now Pat. No. 8,023,932.

(51) Int. Cl.
*H04M 3/00* (2006.01)

(52) U.S. Cl. .......... 455/418; 455/414.1; 455/414.2; 455/414.3; 455/414.4; 455/419; 455/420; 455/435.3; 455/466

(58) Field of Classification Search .......... 455/403, 455/414.1–414.4, 418–420, 435.3, 466
See application file for complete search history.

(56) References Cited

U.S. PATENT DOCUMENTS

| | | | |
|---|---|---|---|
| 5,896,567 A * | 4/1999 | Ogushi | 455/421 |
| 8,023,932 B2 * | 9/2011 | Britt et al. | 455/418 |
| 2002/0147019 A1 * | 10/2002 | Uhlik et al. | 455/452 |
| 2005/0159138 A1 * | 7/2005 | Florkey et al. | 455/414.1 |
| 2005/0182672 A1 * | 8/2005 | Hemm et al. | 705/9 |
| 2006/0140202 A1 * | 6/2006 | Garg et al. | 370/412 |
| 2006/0230350 A1 * | 10/2006 | Baluja | 715/700 |
| 2007/0190980 A1 | 8/2007 | Britt et al. | |

OTHER PUBLICATIONS

"Final Office Action", U.S. Appl. No. 11/351,982, (Feb. 2, 2010),12 pages.
"Final Office Action", U.S. Appl. No. 11/351,982, (Mar. 17, 2009),10 pages.
"Non-Final Office Action", U.S. Appl. No. 11/251,982, (Jun. 23, 2008),8 pages.
"Non-Final Office Action", U.S. Appl. No. 11/351,982, (Sep. 17, 2009),10 pages.
"Notice of Allowance", U.S. Appl. No. 11/351,982, (Jun. 24, 2011),9 pages.

* cited by examiner

*Primary Examiner* — Wayne Cai
*Assistant Examiner* — Matthew Genack
(74) *Attorney, Agent, or Firm* — Wolfe-SBMC

(57) ABSTRACT

In embodiments of managing subscribers on a cellular network, a service provider tracks subscriber devices that are connected for voice communication via a network. The service provider can estimate an increased service load on the network by combining a number of the subscriber devices estimated to still be connected at an appointed time with a number of additional subscriber devices estimated to request connection at or within a predetermined range of the appointed time. The service provider can then cause a number of inactive subscriber devices to be disconnected for at least a predetermined period of time in anticipation of the increased service load.

20 Claims, 3 Drawing Sheets

MANAGING SUBSCRIBERS ON A CELLULAR NETWORK

RELATED APPLICATION

This application is a continuation of and claims priority to U.S. Pat. No. 8,023,932 (U.S. patent application Ser. No. 11/351,982 filed Feb. 10, 2006) entitled "Managing Subscribers on a Cellular Network", the disclosure of which is incorporated by reference herein in its entirety.

BACKGROUND

General packet radio services (GPRS) are commonly used to provide data services over cellular networks. Often, the cellular provider assigns a private Internet address to each of the subscribers as the subscribers log onto the service. Problems can occur in managing these addresses, particularly where a limited number of addresses are used by a cellular provider.

SUMMARY

Managing subscribers on a cellular network is described. In one embodiment, a data and message service provider (DMSP) tracks the number of connected subscribers. The DMSP executes an algorithm for determining when connected subscribers which are not active should be disconnected. The DMSP causes subscribers to be disconnected in accordance with the algorithm.

In one embodiment, a message is sent to the connected subscriber instructing the subscriber to disconnect for a predetermined period of time when the number of connected subscribers exceeds a predetermined number and then to reconnect. A least recently used (LRU) connection table is maintained to select inactive subscribers for disconnection. A "dummy" indication is provided to the subscriber to indicate that the subscriber is still connected. If the subscriber requests service, a new address is immediately assigned to the subscriber.

BRIEF DESCRIPTION OF THE DRAWINGS

Embodiments of managing subscribers on a cellular network are described with reference to the following drawings. The same numbers are used throughout the drawings to reference like features and components.

DETAILED DESCRIPTION

Managing subscribers on a cellular network, particularly those that have Internet connections, is described. In the following description, numerous specific details are set forth, in order to provide a thorough understanding, yet it will be apparent to one skilled in the art, that managing subscribers on a cellular network may be practiced without these specific details. In other instances, well-known technology is not set forth in detail.

Figure 1:
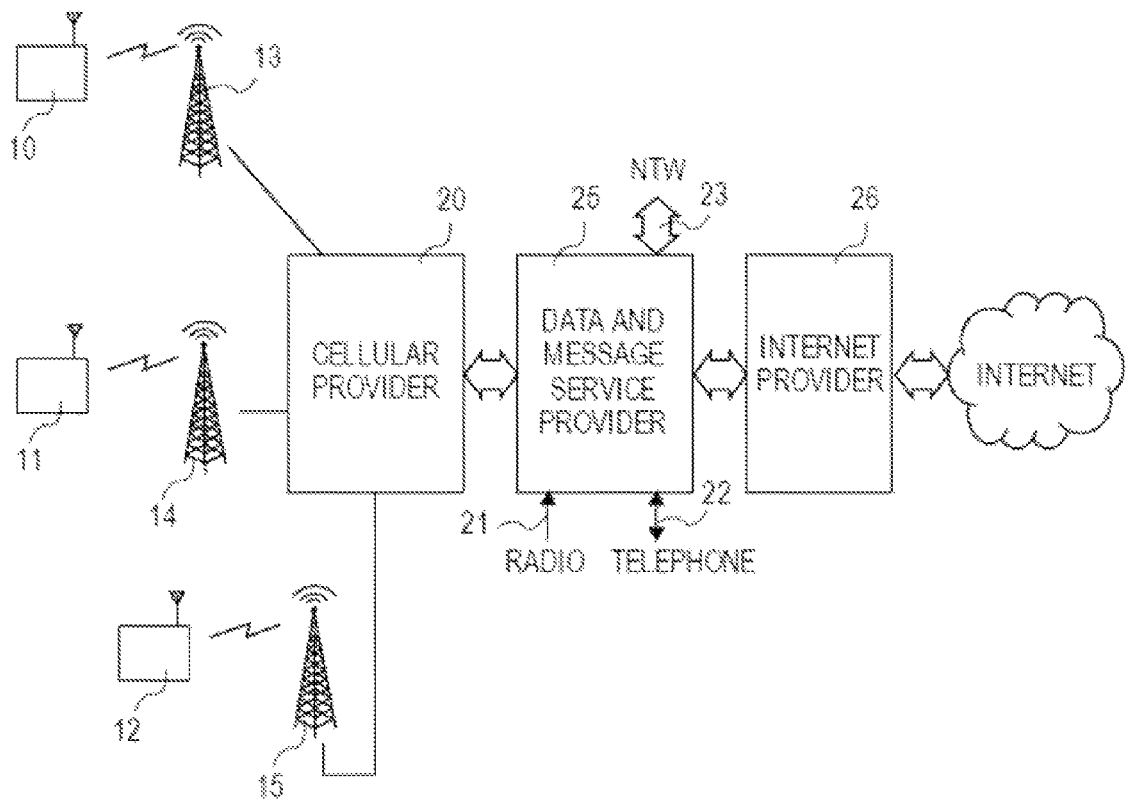
FIG. 1 is a block diagram illustrating a cellular provider, data and message service provider (DMSP), and Internet provider as existing in the prior art.

FIG. 1 illustrates a system providing data services and e-mail messages to cellular subscribers. Subscribers 10, 11 and 12 of FIG. 1, each includes a hand-held device which receives and transmits radio signals to enable both voice and data communications through a cellular provider 20. (Subscribers and their devices are often referred to below simply as "subscribers.") In a cellular system as illustrated, each of the devices communicates through a base station such as stations 13, 14 and 15. These stations receive and communicate signals to the cellular provider 20 as is well-known.

The subscribers include ordinary hand-held devices including devices with displays, keyboards, thumbwheels, and other interface mechanisms that permit voice and data communications including e-mail, the full range of Internet services and in some cases direct access to private networks. One commercially available device is manufactured by Danger, Inc. and sold under the trademark Sidekick® in conjunction with cellular service providers such as T-Mobile®. Other subscriber devices are manufactured by companies such as Sony, RIM, Nokia, and others.

Often, there is a data and message service provider (DMSP), such as shown by DMSP 25 in FIG. 1, operating between the cellular provider 20 and Internet provider 26. For e-mail, for instance, DMSP 25 may filter, store, re-format and edit messages; convert text messages to voice; and, other e-mail related services. For other Internet services, the provider 25 may act as a proxy, and again by way of example, allowing a subscriber 10 to have Internet access without having a full client operating system such as Windows® and a browser such as Explorer®. In other cases, the subscribers may have a traditional operating system and browser and rely less upon computer resources at the DMSP 25.

DMSP 25 may be connected to other facilities of the same provider, other providers and private networks such as shown by connection 23. The DMSP may also receive voice and data communications from the public switched telephone network (PSTN) shown as line 22, and broadcasted material and data such as shown through connection 21. DMSP 25 is often connected to the Internet through an Internet provider such as provider 26.

In typical operation, a subscriber 11 requests a data service and broadcasts such a request through the base station 14 to the provider 20. Provider 20, in conjunction with the DMSP 25, assigns an address to the subscriber 11 which is referred to herein below as a private IP address (PRIPA). The private IP address, as will be discussed, is different from the Internet address used to access the Internet. This address is used by the cellular provider 20 to reach the subscribers of provider 20 and by DMSP 25 to track its subscribers that are connected to it through the provider 20. The request of the subscriber 11 is received by the DMSP 25. If the subscriber requires access to the Internet, DMSP 25 through the Internet provider 26 receives an Internet address (different from the PRIPA) to obtain the required data over the Internet. Data communications between provider 25 and subscriber 11 occur using the PRIPA. These communications may include e-mail, instant messages, access to websites, access to private networks and servers, and other communications obtainable over the public packet network.

Ordinarily, a subscriber remains connected even if the subscriber is inactive. Periodically, signals are sent between the subscriber and providers to indicate that the subscriber is still connected, even though no specific service is being requested by the subscriber. This is typically the case where a subscriber logs on to check his or her e-mail, and then remains connected, expecting to be notified upon the arrival of additional e-mail. Thus, at any given time, there are both active connected subscribers and inactive connected subscribers.

In some cases, the cellular provider 20 has a limited number of PRIPAs that it can manage and the number of such addresses that can be used by the DMSP 25 are thus limited. There may not be sufficient number of unassigned PRIPAs to meet the needs of subscribers who are logging on to request service.

Figure 2:
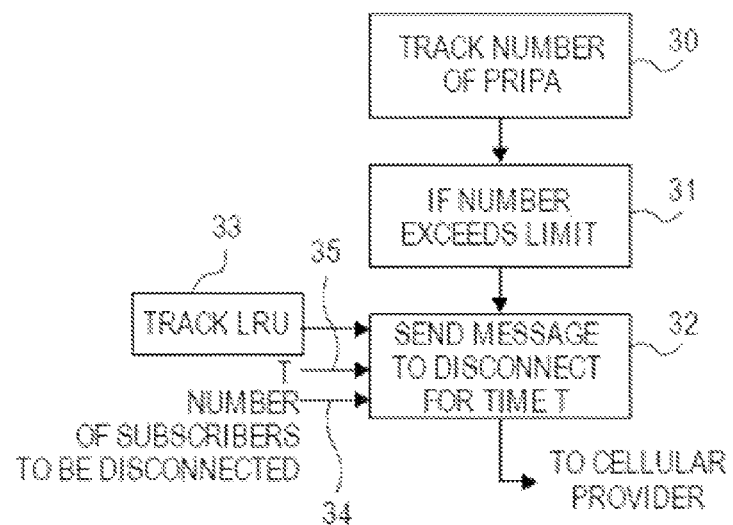
FIG. 2 illustrates a method for limiting the number of addresses that are assigned by the cellular provider on behalf of the DMSP.

To solve this problem, the DMSP 25 controls the number of subscribers connected to it through the provider 20. Subscribers that are connected, but inactive, are instructed to disconnect, as will be described. FIG. 2 illustrates a method for controlling the number of subscribers that are connected. This method may be implemented using ordinary computer resources within the DMSP 25.

First, as shown by step 30, the number of PRIPAs which the cellular provider 20 has assigned on behalf of DMSP 25 are tracked. These represent all the subscribers that requested service and remain connected.

In one embodiment, the DMSP 25 causes the disconnection of some of the connected, but inactive, subscribers when the number of connected subscribers exceeds a predetermined limit. This is shown by step 31 of FIG. 2. This limit may be set to a number below the maximum number of PRIPAs available to the DMSP 25, to provide some margin for additional services, if required. When the number of connected subscribers exceeds the set limit, the selected subscribers receive messages, originating with DMSP 25 and sent through provider 20, requesting that they disconnect, as shown by step 32 of FIG. 2. This causes the subscriber to surrender its PRIPA. The message requests that the subscriber disconnect for a time "T" and that after the expiration of that time to reconnect. Upon reconnecting, the cellular provider 25 provides a new PRIPA.

The message sent to the subscriber requesting the disconnection for the time T, is transparent to the user. That is, the user does not know the message has been received, and the display viewed by the user, in one embodiment, indicates that the user is still connected. The disconnect message includes a field recognized by the subscriber to provide a "dummy" indication of a connection even though the subscriber is disconnected. Additionally, the subscriber receives the time "T" and sets a timer which causes the subscriber to reconnect upon expiration of the time. Consequently, the user is unaware of the fact that he or she has been disconnected. Alternatively, users can be informed that they are in a standby state or other state. In any event, whatever indication is given to the user, it should ideally be something short of causing the user to believe that he or she needs to reconnect.

DMSP 25, in effect, tracks for each connected user, the time when the user last requested service. As will be discussed, this is done in a list of connected subscribers by moving active subscribers to the top of the list. This is referred to as the "connect" list. The maintenance of this list is shown as step 33 in FIG. 2 to indicate that the list tracks the least recently used (LRU) subscribers. The disconnect messages are sent to the subscribers having the LRU connections.

An algorithm is used to decide how many users should be disconnected. In one embodiment, it simply controls the sending of disconnect messages to inactive subscribers over a predetermined number of PRIPAs. In a more complex embodiment, discussed in conjunction with FIG. 5, the trend of subscribers logging on, or off, can be estimated and used to manage the PRIPAs.

As mentioned, the disconnect message includes a time field to indicate how long the subscriber should remain disconnected. This number can be arbitrarily set and then, if needed, adjust based on demand. For instance, T can be 10 minutes and then staggered times can be used to prevent too many subscribers from reconnecting at the same time and thereby overwhelming the system.

Figure 3:
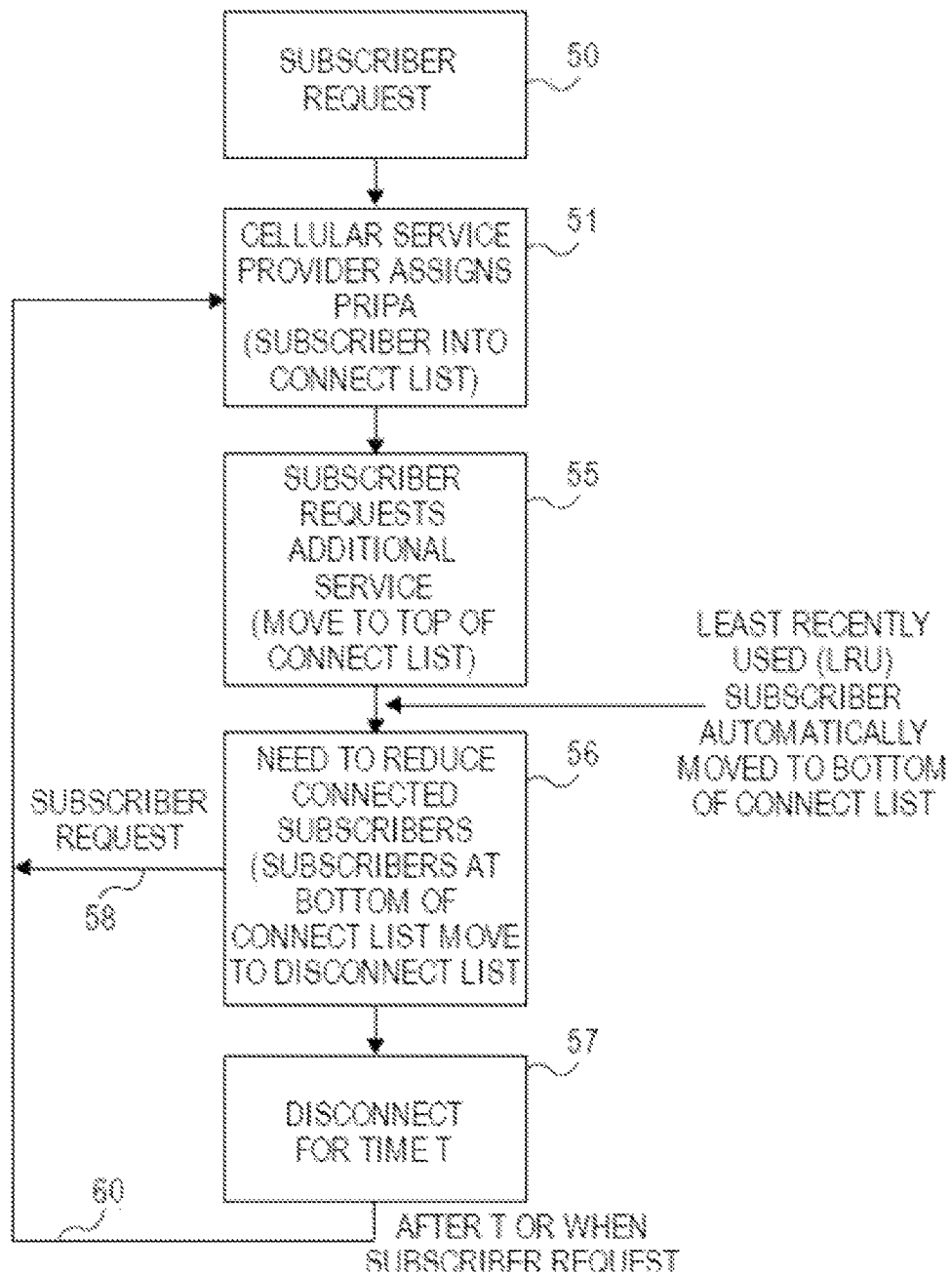
FIG. 3 illustrates a method for connecting and disconnecting subscribers.

The operation of the described method is shown in FIG. 3. First assume that a subscriber requests service for the first time, that is the subscriber logs on as shown at step 50. When this occurs, the cellular service provider 20, in conjunction with the DMSP 25, assigns a PRIPA to the subscriber as shown at step 51. The subscriber is placed into the connect list maintained by the DMSP 25. In one embodiment, upon first requesting service, the subscriber is placed at the top of the list.

As shown at step 55, each time the subscriber requests additional service, it is moved back to the top of the connect list. Subscribers not requesting service therefore are pushed down in the list, while those that are more active remain higher in the list. Consequently, a least recently used (LRU) algorithm is implemented with the subscribers requesting the least service being moved to the bottom of the connect list.

When it is determined that subscribers need to be disconnected because too many subscribers are connected, disconnect messages are sent at step 56, causing subscribers to be disconnected for a time T, step 57. A dummy "connection" is provided so that the user is left with the impression that he or she is connected. The dummy connection is not a real connection, but rather a plan to reconnect at a predetermined time, however, the dummy connection gives the sense of being connected to the subscriber. The subscribers selected for receiving the disconnect message are those at the bottom of the connect list. These subscribers are moved to a disconnect list, also maintained by the DMSP 25.

At any time that a subscriber requests service, as indicated by line 58, or after the expiration of the time T as indicated by line 60, the subscriber is reconnected and is provided a PRIPA as indicated by step 51. A reconnect list, in one embodiment, is maintained for subscribers that are to be reconnected, thus a subscriber may be in the connected, disconnected, or the reconnect list.

Figure 4:
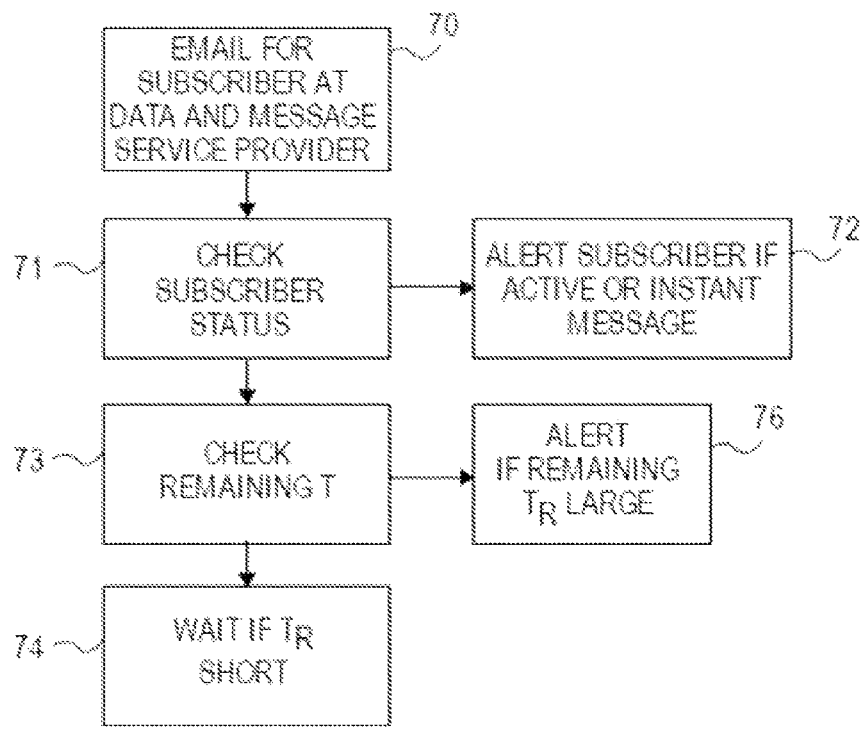
FIG. 4 illustrates a method for reconnecting subscribers.

DMSP 25 may itself elect to reconnect a subscriber before the passage of the time T. Assume as shown by step 70 of FIG. 4 that the DMSP 25 receives an email for the subscriber. DMSP 25 checks the status of the subscriber by scanning the lists as indicated by step 71. If the subscriber is connected, the subscriber can be immediately alerted, as illustrated at step 72. Moreover, if the message is an instant message, or other high-priority message, the DMSP 25 may immediately reconnect the subscriber through provider 20 at any time during the time T in order to deliver the instant message. This is also shown by step 72. On the other hand, if an ordinary e-mail is received by the service provider 25 and the subscriber is disconnected during a time T, the service can check to see how much time remains before the subscriber reconnects. This is demonstrated as step 73. If the time remaining is relatively short, as shown in step 74, DMSP 25 can wait until the subscriber reconnects to deliver the message rather than cause the subscriber to be immediately reconnected. On the other hand, as indicated at step 76, if the remaining time is relatively long, the service provider may elect to immediately notify the subscriber. By way of example, if T is 10 minutes, and there is only one minute remaining when a message is received, provider 25 may elect to wait the one minute before notifying the subscriber of the incoming message. In contrast, if nine minutes remain before the subscriber will reconnect, the service provider may elect to send a message to the subscriber causing a reconnection to provide the message.

A subscriber may also be asked to reconnect through an alternate communication channel such as telephone or a short message service (SMS) message.

Figure 5:
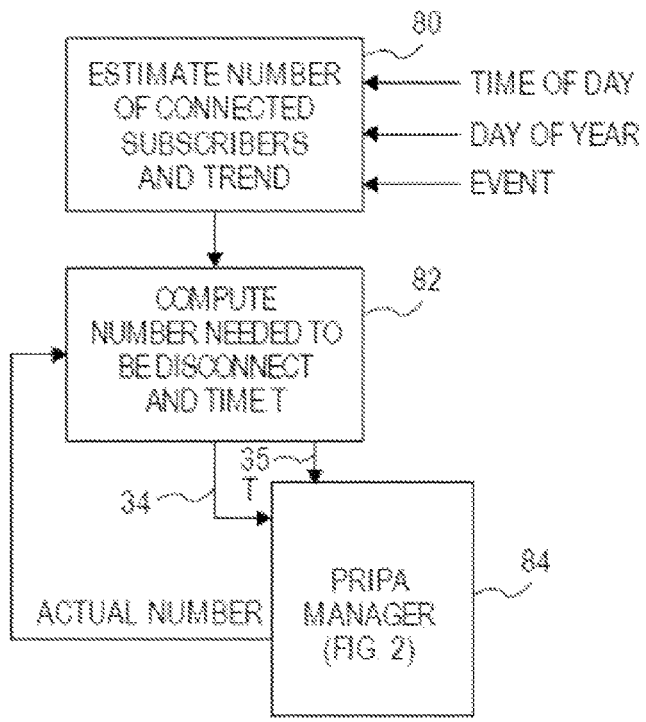
FIG. 5 illustrates a method for determining how many inactive, but connected subscribers, should be disconnected.

A more complex algorithm for determining the number of subscribers to be disconnected and the time T is shown in FIG. 5. The method of FIG. 2 is indicated as the PRIPA manager 84 of FIG. 2. It receives the number of subscribers to be disconnected on line 35 and time "T" on line 34 from the algorithm implemented in step 82. The manager provides the actual number of connected subscribers which the manager 84 is tracking, as indicated by step 30 of FIG. 2.

In step 80 of FIG. 5, the estimated number of connected subscribers is determined along with an expected trend. The total number of subscribers to the DMSP 25 of FIG. 1 in a particular region serviced by the cellular provider 20 is typically known. The number of these subscribers that are expected to be connected at any given time is most often a function of the time of day and the day of the year. For instance, fewer subscribers are connected at 2AM when compared to 2PM. Moreover, the DMSP 25 has a history of connection activities based on, for example, weekdays versus weekends, and special days such as holidays. Thus, the day of year is a factor in determining the estimated number of subscribers that are expected to be connected at a particular time of day. Additionally, events may give rise to an unusually large number of subscribers connecting. For example, a sporting event such as the World Series, a major news event, unusual weather, natural disaster, etc., all cause more than the expected number of subscribers to request service. This can also be used to estimate the number of subscribers that are expected to be connected at a given time and the expected trend.

In step 82 the estimated number of connected subscribers is used along with the trending data to provide a number of subscribers to be disconnected as will be described below. The computation of this step can be adjusted based on actual numbers of connected subscribers provided from the manager 84. Also, if the number of connected subscribers is expected to be near the maximum number of PRIPAs available to the DMSP 25, the time T may be staggered, say between 10 and 15 minutes. This will reduce the overhead associated with too many disconnected subscribers reconnecting at the same time.

By way of example, assume that step 80 determines an estimated 5,000 subscribers will be connected at 9PM, of which 3,000 are estimated to be inactive. Assume further that there are 6,000 PRIPAs that can be assigned and that this number of addresses leaves additional addresses for a safety margin of service. If the trend of additional subscribers expected to request a connection is equal to the number expected to log off or become inactive, that is no additional increase in the total number of connected and active subscribers is expected, no disconnect messages need be sent. On the other hand, if the trend is that the number of subscriber connections is expected to increase to 7,000 in the next short period of time, with 3,000 estimated to be inactive, then it is known that at least 1,000 of the inactive subscribers should be disconnected. The bottom 1,000 subscribers in the connect list are selected to be disconnected and are moved to the disconnect list. Moreover, if the disconnect time T for all these subscribers is the same, too many will be reconnecting at the same time. Therefore, T will be staggered for those receiving the disconnect message to prevent too many reconnections at the same time. As shown by step 82, the manager 84 disconnects 1,000 subscribers in anticipation of the increased service load with staggered reconnect times.

Thus, a method has been described which allows a DMSP to control the number of addresses assigned to subscribers that are connected, in a manner which is transparent to the subscriber.

The invention claimed is:

1. A system, comprising:
a service provider implemented by a computer processor, the service provider configured to:
track subscriber devices that are connected for voice communication via a network;
estimate an increased service load on the network by combining a number of the subscriber devices estimated to still be connected at an appointed time with a number of additional subscriber devices estimated to request connection at or within a predetermined range of the appointed time; and
cause a number of inactive subscriber devices to be disconnected for at least a predetermined period of time in anticipation of the increased service load.

2. The system of claim 1, wherein the service provider is further configured to track least recently used connections of the subscriber devices in a connect list.

3. The system of claim 2, wherein the subscriber devices that are associated with the least recently used connections are moved down in the connect list, and a subscriber device that requests service is moved up in the connect list.

4. The system of claim 1, wherein the service provider is further configured to compute the number of the inactive subscriber devices to be disconnected for at least the predetermined period of time in anticipation of the increased service load, wherein computation of the number of the inactive subscriber devices takes into account a time of day and the day of a year.

5. The system of claim 1, wherein the service provider is further configured to track a duration of time that is remaining before a disconnected subscriber device will reconnect after being disconnected.

6. The system of claim 5, wherein the service provider is further configured to consider the duration of time that is remaining to determine whether the disconnected subscriber device should be reconnected without waiting for the duration of time that is remaining to expire.

7. The system of claim 1, wherein the service provider is further configured to send disconnect messages to the inactive subscriber devices commanding the inactive subscriber devices to disconnect and then to reconnect after the predetermined period of time.

8. The system of claim 7, wherein the service provider is further configured to send the disconnect messages once the number of the subscriber devices and the additional subscriber devices that are connected on the network reach a predetermined number.

9. The system of claim 7, wherein the service provider is further configured to send the disconnect messages to the inactive subscriber devices that are associated with least recently used connections.

10. The system of claim 1, wherein the service provider is further configured to provide a new address to a disconnected subscriber device when service is requested by the disconnected subscriber device during the predetermined period of time that the disconnected subscriber device is disconnected to enable the disconnected subscriber device to reconnect before expiration of the predetermined period of time.

11. The system of claim 1, wherein the service provider is further configured to initiate that an inactive subscriber device that has been disconnected provide a false indication to a user that the inactive subscriber device remains connected.

12. The system of claim 1, wherein the service provider is further configured to send a reconnect message to a disconnected subscriber device to cause the disconnected subscriber device to reconnect.

13. The system of claim 12, wherein the reconnect message is sent upon receipt of high-priority data for the disconnected subscriber device.

14. A system, comprising:
a service provider implemented by a computer processor, the service provider configured to:
communicate with subscriber devices that are connected to the service provider over a network that facilitates voice communication;
estimate an increased service load on the network by combining a number of the subscriber devices that are estimated to still be connected at an appointed time with a number of additional subscriber devices estimated to request connection at or within a predetermined range of the appointed time;
select one or more of the subscriber devices for disconnection in anticipation of the increased service load; and
command the selected subscriber devices to disconnect for a predetermined period.

15. The system of claim 14, wherein the service provider is further configured to determine whether a disconnected subscriber device should be reconnected without waiting for an expiration of a duration of time that is remaining before the disconnected subscriber device will be reconnected.

16. The system of claim 14, wherein the service provider is further configured to initiate that a disconnected subscriber device provide a false indication to a user that the disconnected subscriber device has an existing connection during the predetermined period of time that the disconnected subscriber device is disconnected.

17. The system of claim 14, wherein the service provider is further configured to select the one or more subscriber devices for disconnection in anticipation of the increased service load based, at least in part, on a number of the subscriber devices that are connected.

18. The system of claim 14, wherein the service provider is further configured to provide a new address to a disconnected subscriber device when service is requested by the disconnected subscriber device during the predetermined period of time that the disconnected subscriber device is disconnected to enable the disconnected subscriber device to reconnect before expiration of the predetermined period of time.

19. The system of claim 18, wherein the service provider is further configured to command the disconnected subscriber device to reconnect upon predetermined conditions.

20. The system of claim 19, wherein one of the predetermined conditions is receipt of an instant message by the service provider for the disconnected subscriber device.

* * * * *